United States Patent
A-Gi

(10) Patent No.: US 6,899,450 B2
(45) Date of Patent: May 31, 2005

(54) REAR ILLUMINATION AND REFLECTIVE VIEWING FIXTURE FOR MOTOR VEHICLES

(76) Inventor: Chou A-Gi, No. 184-3, Lane 75, Dah-Chang Road, Sec. 1, Long-Tarn Hsiang, Tao-Yuan Hsien (TW)

( * ) Notice: Subject to any disclaimer, the term of this patent is extended or adjusted under 35 U.S.C. 154(b) by 0 days.

(21) Appl. No.: 10/679,018

(22) Filed: Oct. 1, 2003

(65) Prior Publication Data

US 2004/0184283 A1 Sep. 23, 2004

(51) Int. Cl.$^7$ .......................................... F21W 101/02
(52) U.S. Cl. ...................... 362/496; 362/524
(58) Field of Search ................. 362/543, 523, 362/524, 496, 487

(56) References Cited

U.S. PATENT DOCUMENTS 4,819,132 A * 4/1989 Hwan et al. ................ 362/541
6,637,806 B2 * 10/2003 Kazama .................... 296/180.1

* cited by examiner

Primary Examiner—Laura. K. Tso

(57) ABSTRACT

A rear illumination and reflective viewing fixture for motor vehicles comprised of a spoiler member, a left and a right mounting base for the pivotable installation of the spoiler member onto the posterior aspect of a van or other vehicle, and a drive mechanism. The spoiler member has a minimum of one mirror and two directionally adjustable lamps, with a rod situated in each of its two extremities that enables coupling to the left and right mounting bases. The drive mechanism consists of a motor, two bevel gears, and two microswitches that are installed inside the left mounting base and utilized to axially revolve the spoiler member. The electrical wiring of the two directionally adjustable lamps and the drive mechanism motor is connected to the reverse light power supply lines of the host motor vehicle. When a vehicle equipped with the present invention is backed up, the two directionally adjustable lamps illuminate the immediate rear of the vehicle, enabling the driver to clearly view the situation as reflected by the mirror on the spoiler member and thereby conveniently and safely drive the vehicle towards the rear.

2 Claims, 4 Drawing Sheets

REAR ILLUMINATION AND REFLECTIVE VIEWING FIXTURE FOR MOTOR VEHICLES

BACKGROUND OF THE INVENTION

1) Field of the Invention

The invention herein relates to automotive accessories, specifically a rear illumination and reflective viewing fixture for motor vehicles, including vans and other models, in which the area to the immediate rear is illuminated whenever a vehicle equipped with the present invention is driven backward in reverse gear, enabling the driver to clearly see the situation behind the vehicle and thereby conveniently and safely drive towards the rear.

2) Description of the Prior Art

Conventional motor vehicles (such as trucks, sedans, vans, jeeps, and buses, etc.) are not equipped with backside mirrors or high luminosity lamps. As a result, drivers can only see the situation behind the vehicle via two side view mirrors at the front of the vehicle. For most medium- and compact-size sedans, since the body of the vehicle is smaller and shorter and thus the line of sight dead angle to the immediate rear of the vehicle body is limited, the said two side view mirrors at the front of the vehicle or the rear view mirror in the driver's cab are sufficient to permit reversal. However, in the case of a larger vehicle body such as taller or lengthier vans or buses, the line of sight dead angle to the immediate rear of the vehicle body is quite substantial. If only the two side view mirrors at the front of the vehicle or the rear view mirror in the driver's cab were visually referenced, backing up the vehicle would be inconvenient and dangerous because seeing behind the vehicle would not be possible. As a result, bus or van transportation companies (such as children's shuttles) often rely on personnel that ride along to assist during vehicle reversal, thereby ensuring safety. However, many vans or municipal buses currently have no such ride along personnel, resulting in numerous accidents involving loss of life (especially young children) and damage to property. In view of this situation, the applicant of the invention herein researched and developed the rear illumination and reflective viewing fixture for motor vehicles of the invention herein.

SUMMARY OF THE INVENTION

The objective of the invention herein is to provide a rear illumination and reflective viewing fixture for motor vehicles capable of illuminating and mirroring the position at the immediate rear extent of a motor vehicle to increase driving safety when the said vehicle is backed up and, furthermore, that also functions as an spoiler. As such, the said invention is comprised of a spoiler member, a left and a right mounting base facilitating the pivotable installation of the said spoiler member onto the flat and even posterior rear end of a van or other similar category motor vehicle, and a drive mechanism. The said spoiler member has a minimum of one mirror and two directionally adjustable lamps, with a rod situated in each of its two extremities that enables coupling to the said left and right mounting bases. The said drive mechanism consists of a motor, two bevel gears, and two microswitches that are installed inside the said left mounting base and utilized to axially revolve the said spoiler member. The electrical wiring of the two directionally adjustable lamps and the said drive mechanism motor is connected to the reverse light power supply lines of the host motor vehicle such that when the said vehicle is backed up, the two directionally adjustable lamps illuminate the immediate rear of the vehicle and the trailing edge of the said spoiler member is canted downward.

DETAILED DESCRIPTION OF THE INVENTION

Figure 1:
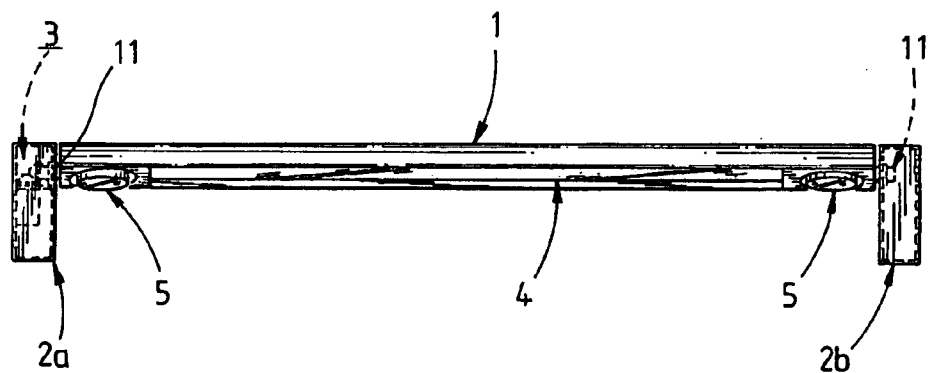
FIG. 1 is an orthographic drawing with cross-sectional details of the invention herein, as viewed from the front.
Figure 2:
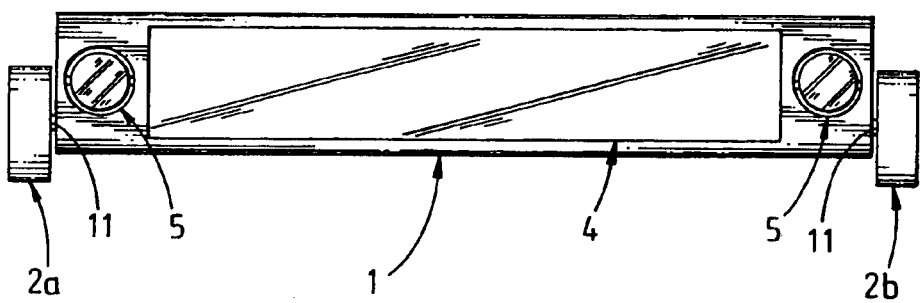
FIG. 2 is an orthographic drawing of the invention herein, as viewed from the bottom.
Figure 3:
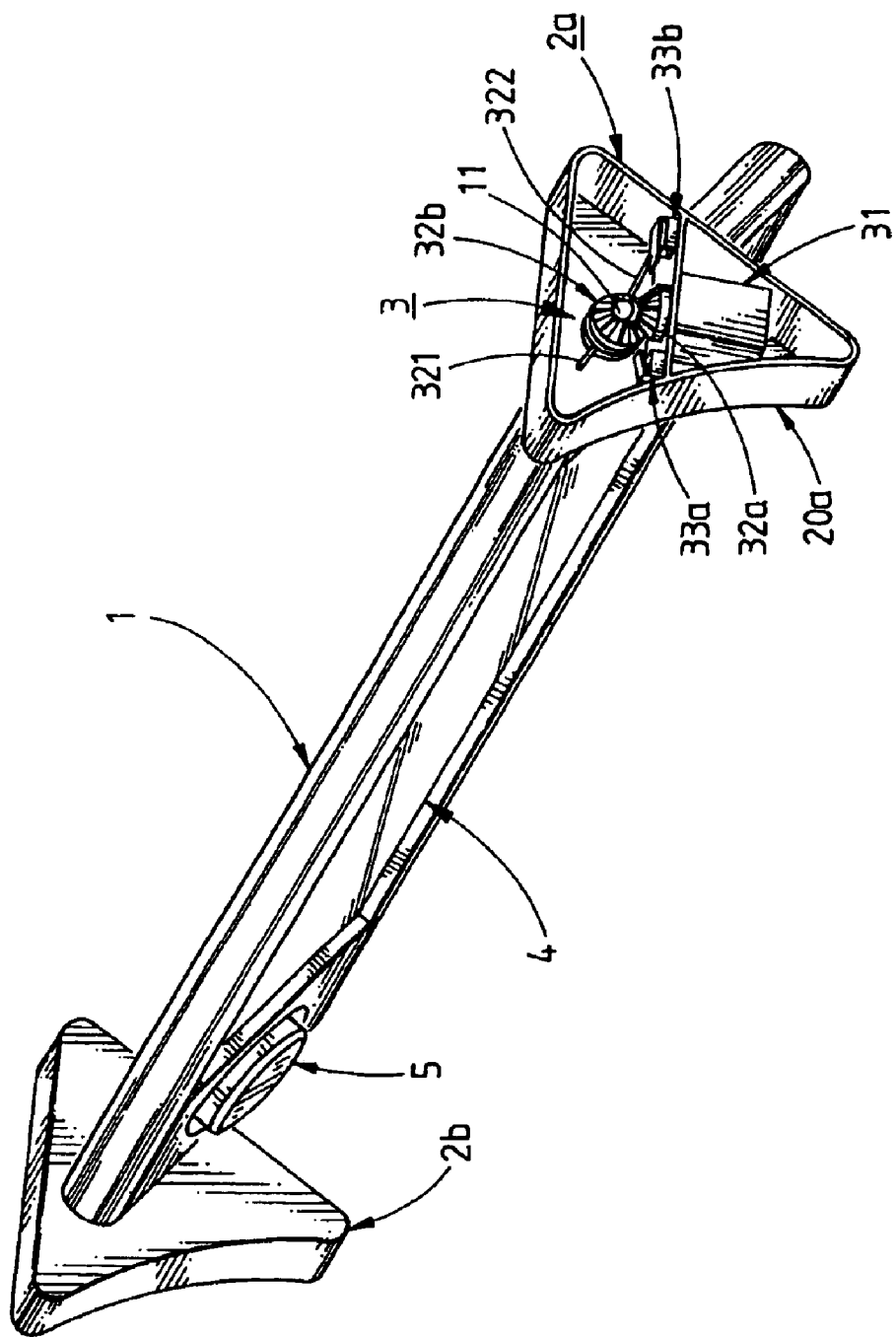
FIG. 3 is an isometric drawing of the left mounting base of the invention herein when the cover plate is removed.
Figure 4:
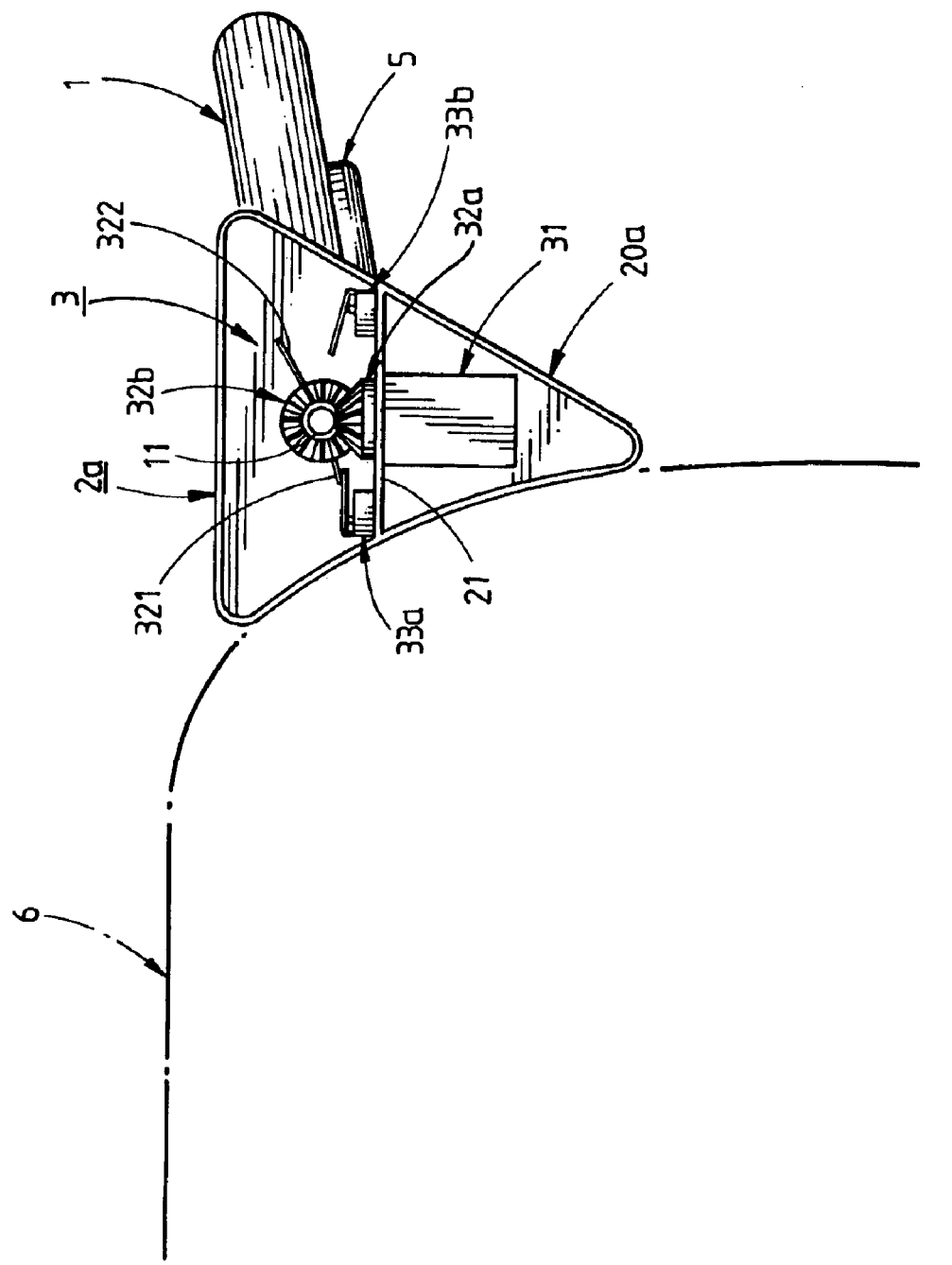
FIG. 4 is an orthographic drawing of the invention herein that illustrates the installation and utilization at the left side.
Figure 5:
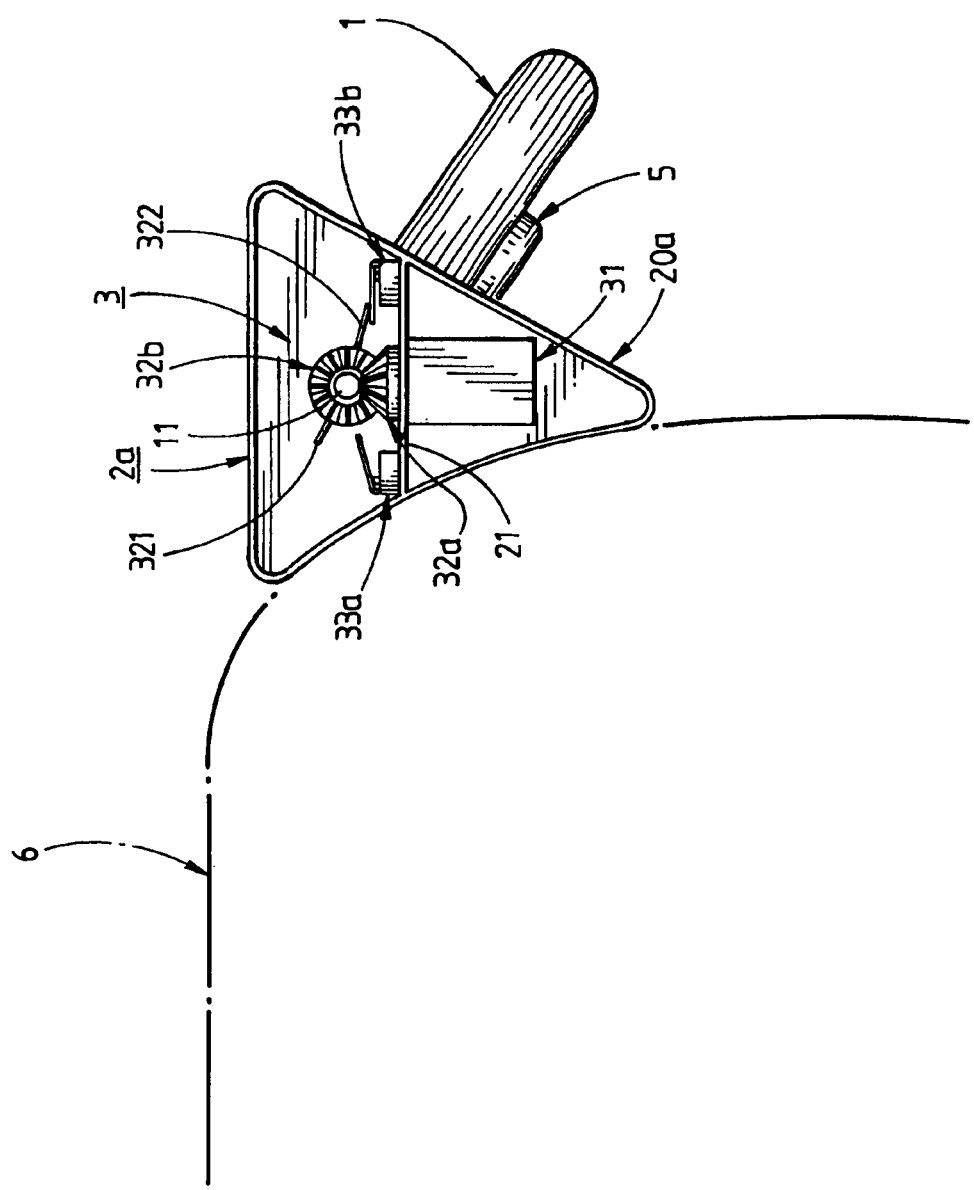
FIG. 5 is an orthographic drawing of the invention herein that illustrates the installation and utilization at the left side when the vehicle is reversing.

Referring to FIG. 1, FIG. 2, and FIG. 3, the rear illumination and reflective viewing fixture of the invention herein is comprised of a spoiler member 1, a left and a right mounting base 2a and 2b for the pivotable installation of the spoiler member 1 onto the posterior aspect of a van or other similar category motor vehicle 6 (as shown in FIG. 4 and FIG. 5), and a drive mechanism 3. A minimum of one mirror 4 and two directionally adjustable lamps 5 are positioned on the (inferior) lateral surface of the spoiler member 1 such that when the said motor vehicle 6 is reversing backward, the illumination emitted facilitates reflection from the rear of the said motor vehicle that is viewable from the driver's seat; a rod 11 (as shown in FIG. 1) is situated in each of the two extremities of the said spoiler member 1, with each movably coupled to the said left and right mounting bases 2a and 2b.

The drive mechanism 3 of the invention herein, as indicated in FIG. 3, FIG. 4, and FIG. 5, consists of a motor 31, two bevel gears 32a and 32b, and two microswitches 33a and 33b. Wherein, the said motor 31 is fixed onto the panel 21 at the lower lateral extent of the right mounting base 2b body 20a, one said bevel gear 32a is fitted onto the shaft of the said motor 31, and the other bevel gear 32b is placed onto the rod 11 at the left lateral extremity of the said spoiler member 1 and enmeshed with the bevel gear 32a on the motor 31 shaft; as such, when the said motor 31 rotates the bevel gear 32a, the said other bevel gear 32b revolves the said spoiler member 1 downward, as indicated in FIG. 5, or revolves it upward and back to the original position shown in FIG. 4. To accurately limit the upward and downward revolving range of the said spoiler member 1, the said microswitches 33a and 33b must be respectively installed on the left and right sides of the panel 21 of the said right mounting base 2b body 20a and, furthermore, a left and a right contact element 321 and 322 fastened to the body of the said other bevel gear 32b such that when, as previously described, the said spoiler member 1 is revolved downward by the said motor 31 and brought to the position shown in FIG. 5, the said right contact element 321 touches the said right microswitch 33b and terminates electrical current supplied to the said motor 31, halting the operation of the said motor 31 which then no longer revolves the said spoiler member 1 downward and maintains its trailing edge at a fixed downward incline, as indicated in FIG. 5; when the said motor 31 revolves the said spoiler member 1 from the position pictured in FIG. 5 towards the original position illustrated in FIG. 4 and the said left contact element 321 touches the said left microswitch 33a, thereby disrupting the supply of electrical current to the said motor 31 to stop the operation of the said motor 31, which then no longer revolves the said spoiler member 1 upward.

When the rear illumination and reflective viewing fixture of the invention herein is installed for utilization, as indicated in FIG. 4 and FIG. 5, the left and right mounting base 2a and 2b are fastened onto the flat and even posterior end of the van or similar category other motor vehicle 6 and, furthermore, wires that conduct electrical current to the two directionally adjustable lamps 5 positioned on the spoiler member 1 are inserted (not shown in the drawings) through the rod 11 at the left side of the said spoiler member 1 and next connected to the reverse light power supply lines of the host motor vehicle 6, a starting capacitor and a relay (not shown in the drawings) are shunted across the power supply circuit of the drive mechanism 3 motor 31, and then the two microswitches 33a and 33b of the said drive mechanism 3 are connected to the reverse light power supply lines of the said motor vehicle 6 to thereby complete installation.

When the motor vehicle 6 having the installed said rear illumination and reflective viewing fixture is driven forward, the trailing edge of the spoiler member 1 is postured slightly upward as shown in FIG. 4, the said spoiler member 1 serving as an air deflector in this mode; when driven backward, the reverse light power supply of the said motor vehicle 6 is circuited to the two directionally adjustable lamps 5 and the drive mechanism 3 relay (not shown in the drawings) and initiates the operation of motor 31, which then revolves the trailing edge of the said spoiler member 1 downward, but when the right contact element 322 of the bevel gear 32b on the rod 11 at the left side of the said spoiler member 1 touches the right microswitch 33b of the drive mechanism 3, the supply of electrical current to said relay is terminated, halting the operation of the said motor 31 and maintaining the trailing edge of the said spoiler member 1 at a fixed downward incline as indicated in FIG. 5, with the two directionally adjustable lamps 5 remaining lit to illuminate the rear extent of the said motor vehicle 6. As such, the driver of the said motor vehicle 6 can look at the rear view mirror inside the vehicle or turn around and look at the mirror 4 on the said spoiler member 1, the said mirror 4 clearly reflecting the situation at the immediate rear extent of the said motor vehicle 6 to thereby enable convenient and safe back ups. After shifting out of reverse gear at the completion of backing up, the said two directionally adjustable lamps 5 are extinguished, but the electricity stored in the said starting capacitor is sufficient to power the said motor 31 in the opposite direction of rotation to revolve the trailing edge of the said spoiler member 1 from the downwardly inclined position shown in FIG. 5 such that the trailing edge returns to the upwardly inclined position depicted in FIG. 4; furthermore, when the left contact element 321 on the said bevel gear 32b touches the left microswitch 33a of the said drive mechanism 3, the supply of electrical current to said motor 31 starting capacitor is terminated, maintaining the trailing edge of the said spoiler member 1 at a fixed upward incline.

What is claimed is:

1. A rear illumination and reflective viewing fixture for motor vehicles comprising:
    a spoiler member having a rod situated in each of its two extremities and, furthermore, a minimum of one mirror and two directionally adjustable lamps respectively positioned along the center of the inferior lateral surface and two ends of said spoiler member;
    a left and a right mourning base for the pivotable installation of said spoiler member onto the posterior aspect of a van or other similar category motor vehicle; and
    a drive mechanism consisting of:
        a motor fixed onto a panel at the lower lateral extent of said right mounting base body;
        a first bevel gear fitted onto the shaft of said motor;
        a second bevel gear placed onto said rod at the left lateral extremity of said spoiler member and enmeshed with said first bevel gear, that also includes a left and a right contact element fastened to the body of said second bevel gear;
        two microswitches respectively installed on the left and right sides of said panel of said right mounting base body.

2. The rear illumination and reflective viewing fixture for motor vehicles of claim 1, wherein said two directionally adjustable lamps are furnished electrical current by means of wires that are inserted through the rod at one side of said spoiler member and placed in continuity with the reverse light power supply lines of said motor vehicle targeted for installation and, furthermore, a starting capacitor and a relay are shunted and then connected to the reverse light power supply lines of said motor vehicle.

* * * * *